United States Patent [19]
Orcel et al.

[11] Patent Number: 6,126,993
[45] Date of Patent: Oct. 3, 2000

[54] COATING COMPOSITIONS FOR OPTICAL FIBERS, AND A METHOD OF COATING OPTICAL FIBERS

[75] Inventors: Gérard Orcel, Maisons Lafitte; Sophie Vanpoulle, Gif sur Yvette, both of France

[73] Assignee: Alcatel, Paris, France

[21] Appl. No.: 09/233,127

[22] Filed: Jan. 19, 1999

[51] Int. Cl.$^7$ .................................. C03C 25/02
[52] U.S. Cl. .................... 427/163.2; 427/508; 427/385.5
[58] Field of Search ................................ 427/508, 163.2, 427/163.1, 385.5

[56] References Cited

U.S. PATENT DOCUMENTS

| | | | |
|---|---|---|---|
| Re. 33,677 | 8/1991 | Vazirani | 427/163 |
| 4,919,514 | 4/1990 | Ebert et al. | 427/163 |
| 5,219,623 | 6/1993 | Petisce | 427/163 |
| 5,536,529 | 7/1996 | Shustack | 427/163.2 |
| 5,593,736 | 1/1997 | Cowen et al. | 427/163.2 |

OTHER PUBLICATIONS

Srinath S. Reddy et al., "Influence of stress relaxation in primary coatings on low temperature attenuation in optical fibers", The Institute of Materials in Plastic in Telecommunication, No. 7, Sep. 4–6, 1995, London, no page numbers.

*Primary Examiner*—Diana Dudash
*Assistant Examiner*—Bret Chen
*Attorney, Agent, or Firm*—Sughrue, Mion, Zinn, Macpeak & Seas, PLLC

[57] ABSTRACT

A method of coating an optical fiber, the method including at least one coating step using a coating composition and at least one polymerization step, the composition including a curable formulation and a compound having a low vaporization temperature, the quantity, by weight, of the compound having a low vaporization temperature lying in the range 0.5% to 20% of the composition, the vaporization temperature lying between the coating temperature and the polymerization temperature. The coating composition includes an acrylate resin and an ether, the quantity, by weight, of the ether lying in the range 0.5% to 20% of the composition. The ether can be an alkyl ether, in particular.

15 Claims, No Drawings

COATING COMPOSITIONS FOR OPTICAL FIBERS, AND A METHOD OF COATING OPTICAL FIBERS

The present invention relates to coating compositions for optical fibers and to a method of coating optical fibers.

BACKGROUND OF THE INVENTION

At present it is conventional to coat optical fibers with two layers of coating (known as "dual-coating"). The first layer, which is in contact with the optical portion of the fiber, provides resilient elastomer cushioning. The second layer is hard and withstands abrasion, and it provides a barrier layer against humidity. At ambient temperature, conventional moduluses for the first and second layers are respectively 1 mega pascal (MPa) to 10 MPa and 200 MPa to 1000 MPa. The two layers are conventionally made of resin, in particular a urethane-acrylate resin. The two layers-are conventionally applied to a fiber in a fiber-drawing tower.

It is conventional for such a fiber-drawing tower to comprise in order:

- a fiber preform unit;
- a first coating station at a temperature of about 20° C. to 80° C. for coating the fiber with a first curable formulation;
- a first curing station comprising a first series of polymerizing lamps, in particular ultraviolet (UV) lamps;
- a first cooling station for cooling the fiber coated in the first layer;
- a second coating station at a temperature of about 20° C. to 80° C. for coating the fiber with a second curable formulation;
- a second curing station comprising a second series of polymerizing lamps, in particular UV lamps;
- a second cooling station for cooling the fiber coated in the second layer; and
- a winding station (comprising a capstan and a winder).

Prior to the winding station, the tower may also comprise an "SZ" station serving to apply twist in alternating directions to the fiber in order to reduce the value of its polarization mode dispersion (PMD).

During the method of coating the two layers, polymerization generates a large amount of heat. This heat as given off gives rise to several problems. These problems comprise coating defects which generally give rise to large fluctuations in diameter and thus to an out-of-specification product that has to be scrapped. In addition, in some cases too high a temperature can slow down polymerization of the resin, thereby giving rise to a coated fiber whose properties vary significantly over time. Premature use of such a fiber, or aging thereof in a humid atmosphere, can result in a product that is defective. In addition, at the end of the first coating step that forms the primary layer, too high a temperature gives rise to problems when coating the second layer, since the resin of the second layer is not always properly applied if the temperature of the substrate is too high. In addition, if the second layer has a pigment, etc., the primary layer cannot continue polymerizing since the pigment forms a barrier preventing UV radiation from penetrating to the primary layer. It is then necessary either to polymerize the primary layer over a longer period of time which means either that the fiber-drawing speed must be reduced or else that a polymerization unit must be added, which in both cases increases the temperature of the fiber and thus the problems associated with temperature, or else it is necessary to increase the distance between the primary and the secondary coating steps, which, while not increasing temperature, does nevertheless require considerable space in the tower. At the end of the second coating step it is also necessary to limit the temperature so that the polymer of the second coating is not imprinted on passing through the capstan and/or the SZ station, since that could subsequently give rise to stresses.

In order to maintain the quality of the fiber coating and of the fiber itself, it is therefore necessary to control the temperature of the coating on leaving the steps in which the primary and secondary layers are polymerized. Such temperature control thus requires that a fraction of the tower is dedicated to cooling the fiber.

At present, two solutions are in use:

i) the fiber is allowed to cool naturally, by increasing the distance between the polymerization (UV) lamps and/or by increasing the distance between the last polymerization (UV) lamp for the first layer and the station for coating the second layer and/or the distance between the last polymerization (UV) lamp for the second layer and the final winding station; or ii) the fiber is subjected to forced cooling by using a cooling tube.

Solution i) is unsatisfactory since it takes up a large amount of space in the tower, which space becomes even greater with the higher fiber travel speeds presently in use.

Solution ii) is not satisfactory either, since it requires investment in additional equipment and it implies an increase in direct costs. Furthermore, to enable the cooling tube to be effective, it is necessary for it to have irises that come as close as possible to the fiber so as to remove the boundary layer which isolates the fiber from its surroundings and which puts a limit on heat exchange, and which therefore constitutes an obstacle to good cooling of the fiber. Unfortunately, when irises are too close to the fiber, there is a risk that they will touch the fiber, thereby increasing the amount of out-of-specification product that needs to be scrapped. Finally, the cooling tube needs to be cleaned regularly, thereby increasing the cycle time.

SUMMARY OF THE INVENTION

The invention therefore proposes a solution that requires no additional space in the tower, nor any additional equipment.

Thus, the invention provides a method of coating an optical fiber, the method comprising at least one coating step using a coating composition and at least one polymerization step, said composition comprising a curable formulation and a compound having a low vaporization temperature, the quantity, by weight, of said compound having a low vaporization temperature lying in the range 0.5% to 20% of said composition, preferably in the range 5% to 15%, said vaporization temperature lying between the coating temperature and the polymerization temperature.

The coating and/or polymerization steps may comprise substeps; for example the polymerization step may be made up of two substeps in two polymerization units (for the same layer of coating).

In an implementation, the method comprises two coating and polymerization steps.

In this implementation, the compound can be added either to the composition for coating the primary layer, or the secondary layer, or else to both the primary and the secondary layers.

Thus, in a first variant of this implementation, the method comprises:

a first coating step with a first coating composition and a polymerization step, said first composition comprising a curable formulation and a compound having a low vaporization temperature; and a second coating step with a second coating composition and a polymerization step, said second composition comprising a curable formulation.

Thus, in a second variant of this implementation, the method comprises:

a first coating step with a first coating composition and a polymerization step, said first composition comprising a curable formulation; and a second coating step with a second coating composition and a polymerization step, said second composition comprising a curable formulation and a compound having a low vaporization temperature.

Thus, in a third variant of this implementation, the method comprises:

a first coating step with a first coating composition and a polymerization step, said first composition comprising a curable formulation and a compound having a low vaporization temperature; and a second coating step with a second coating composition and a polymerization step, said second composition comprising a curable formulation and a compound having a low vaporization temperature.

In this variant, the low vaporization temperature compound of the second composition may have a vaporization temperature that is higher than that of the low vaporization temperature compound of the first composition.

In another implementation, said compound having a low vaporization temperature has a vaporization temperature lying in the range 30° C. to 110° C., and preferably in the range 50° C. to 90° C.

In another implementation, said compound having a low vaporization temperature is an ether, preferably a halogenated or a non-halogenated alkyl ether, advantageously selected from: propyl-1,3-dichloropropyl ether, diethyl ether, butylmethyl ether, terbutylmethyl ether, ethyl propyl ether, and dipropyl ether.

In another implementation, said curable formulation is an acrylate resin, and preferably a urethane-acrylate resin.

In another implementation, the polymerization is UV polymerization.

The invention also provides a coating composition comprising an acrylate resin, preferably a urethane-acrylate resin, and an ether, the quantity of ether, by weight, lying in the range 0.5% to 20% of said composition, and preferably in the range 5% to 15%.

In an embodiment, the ether has a vaporization temperature lying in the range 30° C. to 110° C., preferably in the range 50° C. to 90° C.

In another embodiment, the ether is a halogenated or a non-halogenated alkyl ether, advantageously selected from: propyl-1,3-dichloropropyl ether, diethyl ether, butylmethyl ether, terbutylmethyl ether, ethyl propyl ether, and dipropyl ether.

DETAILED DESCRIPTION OF THE PREFERRED EMBODIMENTS

The invention is described in greater detail in the description below.

The invention is based on the fact that the change of state of the added compound, in particular of ethers, is endothermal.

By adding to the initial formulation of the coating a compound that has a relatively high latent heat of vaporization, at a vaporization (or boiling) temperature that is relatively low, the heat dissipated during polymerization is used in part to vaporize the compound. The temperature at which the composition is applied is generally lower than the vaporization temperature of the added compound, such that vaporization takes place during polymerization and/or at the end thereof. Heat is released during the polymerization, which may be ultraviolet (UV), or electron (EB) polymerization with or without polymerization initiators, since the polymerization reaction is generally exothermal. The compound then vaporizes; vaporization of the compound then consumes the heat present in the cured and/or curing resin and therefore cools it.

Insofar the compound vaporizes, once the coating has polymerized completely there remains substantially no trace of the compound added to the fiber coating. There is no harmful effect on the coating of the optical fiber.

The vaporization (or boiling) temperature is that which applies at ambient pressure since that is the pressure which generally obtains within polymerization enclosures. Nevertheless, if the pressure is reduced, then the temperature which applies is the temperature at that pressure.

By way of example, consideration can be given to a conventional 125 µm optical fiber coated in a first layer having a thickness 180 µm to 200 µm and in a second layer having a thickness of about 245 µm. The formulation of the coating for both layers is a urethane-acrylate resin, and the modulus of the final cured layer is adjusted to satisfy the specific needs of the layers.

The fiber is coated in a fiber-drawing tower, of the type described in the introduction. The speed at which the fiber travels lies in the range 100 meters per minute (m/min) to 2000 m/min, and in particular in the range 500 m/min to 1000 m/min. Both layers are coated at a temperature lying in the range 20° C. to 80° C., and preferably in the range 25° C. to 55° C.

The outlet temperature in the first polymerization station is about 110° C. while the outlet temperature in the second polymerization station is about 140° C. This final outlet temperature is the temperature of the coating at the end of the polymerization step; this temperature is the "polymerization temperature" within the meaning of the present application. It is also possible to vary the parameters so as to obtain outlet temperatures of about 160° C. for one or both stations.

After each layer, the cooling is of the free type. The length of the free space is adjusted to procure cooling by 10° C.

Consideration is now given to the case of dipropyl ether being added to the coating resin. A composition is thus obtained which, by weight relative to the final composition, comprises 90% urethane-acrylate resin and 10% ether. The ether has a vaporization (or boiling) temperature of about 88° C. and a latent heat of vaporization of about 8200 calories per mole (cal/mol). (In general, and in non-limiting manner, this latent heat may lie in the range 6500 cal/mol to 13,000 cal/mol.) This composition can be used for the first layer, for the second layer, and then for both layers of coating.

After adjusting viscosity (e.g. by starting with a formulation having higher viscosity) and using the same operating parameters, the following results have been obtained:

adding ether in the primary layer makes it possible to reduce the temperature of the primary layer by 20° C., so that it went from 110° C. to 90° C.;

adding ether to the secondary layer makes it possible to reduce the temperature of the secondary coating by 10° C., so that it went from 140° C. to 130° C.; and adding ether to both the primary layer and the secondary layer makes it possible to reduce the temperature of the secondary layer by 20° C., so that it went from 140° C. to 120° C.

The free space required for cooling was therefore considerably reduced, and even in some cases made unnecessary.

The final coating had the same characteristics as the previous coating, regardless of whether ether was added to the primary layer, to the secondary layer, or to both layers.

It is also possible for the ether which is added to the coating composition for the secondary layer to have a vaporization (boiling) temperature that is higher than that of the ether for the primary layer, insofar as the temperature of the secondary layer is generally higher than that of the primary layer. This gives an advantage insofar as a higher vaporization temperature generally implies higher vaporization enthalpy (and thus higher latent heat for the change of state); the endothermal effect of the ether (or in more general terms of the added compound) is thus greater, thereby obtaining a greater temperature improvement for the fiber.

The fiber coating resins are advantageously selected in accordance with the teaching of the article by Reddy et al. entitled "Influence of stress relaxation in primary coatings on low temperature attenuation in optical fibers", published by the The Institute of Materials in Plastic in Telecommunication, No. 7, Sep. 4–6, 1995, London.

The invention is not limited to the embodiments described. It applies to any type of resin (of the acrylate, epoxy, or vinyl ether families, or mixtures thereof, etc.); to any type of polymerization (UV, EB, with or without initiators); to any type of fiber (monomode, multimode, specific, etc.); and to single layer coatings; and it can also be implemented in any existing tower, including towers that make use of forced cooling (since it makes it possible to increase throughput and the travel speed of the fiber).

What is claimed is:

1. A method of coating an optical fiber, the method comprising at least one coating step using a coating composition and at least one polymerization step, said composition which is curable, comprising a curable resin and a compound having a predetermined vaporization temperature, a quantity, by weight, of said compound having the predetermined vaporization temperature lying in a range 0.5% to 20% of said composition, a remainder of said quantity of said compound being formed of a resin, said vaporization temperature of said compound lying between a coating temperature and a polymerization temperature.

2. A method according to claim 1, comprising two coating and polymerization steps.

3. A method according to claim 2, comprising:
a first coating step with a first coating composition and a polymerization step, said first composition which is curable and comprising a curable resin and a compound having a predetermined vaporization temperature; and
a second coating step with a second coating composition and a polymerization step, said second composition which is curable and comprising a curable resin.

4. A method according to claim 2, comprising:
a first coating step with a first coating composition and a polymerization step, said first composition which is curable and comprising a curable resin; and
a second coating step with a second coating composition and a polymerization step, said second composition which is curable and comprising a curable resin and a compound having a predetermined vaporization temperature.

5. A method according to claim 2, comprising:
a first coating step with a first coating composition and a polymerization step, said first composition which is curable comprising a curable resin and a compound having a predetermined vaporization temperature; and
a second coating step with a second coating composition and a polymerization step, said second composition which is curable comprising a curable resin and a compound having a predetermined vaporization temperature.

6. A method according to claim 5, in which the predetermined vaporization temperature compound of the second composition has a vaporization temperature that is higher than that of the predetermined vaporization temperature compound of the first composition.

7. A method according to claim 2, in which the polymerization is UV polymerization.

8. A method according to claim 1, in which, in the coating composition, the quantity of said compound having said predetermined vaporization temperature lies, in percentage by weight, in a range 51 to 15% of said composition.

9. A method according to claim 1, in which said compound having said predetermined vaporization temperature has a vaporization temperature lying in a range 30° C. to 110° C.

10. A method according to claim 9, in which said compound having said predetermined vaporization temperature has a vaporization temperature lying in the range 50° C. to 90° C.

11. A method according to claim 1, in which said compound having said predetermined vaporization temperature is an ether.

12. A method according to claim 11, in which said ether is either one of a halogenated and a non-halogenated alkyl ether.

13. A method according to claim 12, in which said ether is selected from: propyl-1,3-dichloropropyl ether, diethyl ether, butylmethyl ether, terbutylmethyl ether, ethyl propyl ether, and dipropyl ether.

14. A method according to claim 1, in which said curable resin is an acrylate resin.

15. A method according to claim 14, in which said acrylate resin is a urethane-acrylate resin.

* * * * *

UNITED STATES PATENT AND TRADEMARK OFFICE
CERTIFICATE OF CORRECTION

PATENT NO. : 6,126,993
DATED : October 3, 2000
INVENTOR(S) : Gerard Orcel, Sophie Vanpoulle It is certified that error appears in the above-identified patent and that said Letters Patent is hereby corrected as shown below:

Column 8,
Line 4, delete "51" and insert therefor -- 5 --.

Signed and Sealed this

Sixth Day of November, 2001

Attest:

NICHOLAS P. GODICI
Attesting Officer  Acting Director of the United States Patent and Trademark Office